United States Patent
Yoshio et al.

(10) Patent No.: US 9,390,334 B2
(45) Date of Patent: Jul. 12, 2016

(54) NUMBER OF PERSONS MEASUREMENT DEVICE

(75) Inventors: Hiroaki Yoshio, Kanagawa (JP); Jun Nishimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 14/008,097

(22) PCT Filed: Mar. 28, 2012

(86) PCT No.: PCT/JP2012/002163
§ 371 (c)(1),
(2), (4) Date: Sep. 27, 2013

(87) PCT Pub. No.: WO2012/132437
PCT Pub. Date: Oct. 4, 2012

(65) Prior Publication Data
US 2014/0037147 A1 Feb. 6, 2014

(30) Foreign Application Priority Data
Mar. 31, 2011 (JP) .................. 2011-080294

(51) Int. Cl.
*G06K 9/00* (2006.01)
*G06K 9/32* (2006.01)
(Continued)

(52) U.S. Cl.
CPC ........ *G06K 9/00778* (2013.01); *G06K 9/00369* (2013.01); *G06T 7/0081* (2013.01);
(Continued)

(58) Field of Classification Search
CPC ............ G06K 9/00771; G06K 9/3241; G06K 9/00778; G06K 9/00369; G06T 2207/30196; G06T 2207/30232; G06T 2207/30242; G06T 7/20; G06T 7/0081
See application file for complete search history.

(56) References Cited

U.S. PATENT DOCUMENTS

2006/0115116 A1* 6/2006 Iwasaki .............. G06K 9/00348
  382/103
2008/0130952 A1 6/2008 Mittal et al.
(Continued)

FOREIGN PATENT DOCUMENTS

CN 101763669 6/2010
JP 06-223157 8/1994
(Continued)

OTHER PUBLICATIONS

Byeoung-Su Kim et al., "A Method of Counting Pedestrians in Crowded Scenes", Sep. 15, 2008, Advanced Intelligent Computing Theories and Applications With Aspects of Artificial Intelligence; [Lecture Notes in Computer Science], Springer Berlin Heidelberg, Belin, Heidelberg, pp. 1117-1126.
(Continued)

*Primary Examiner* — Vu Le
*Assistant Examiner* — Kenny Cese
(74) *Attorney, Agent, or Firm* — Greenblum & Bernstein, P.L.C.

(57) ABSTRACT

A person extraction unit extracts a person from an image input into an image input unit. An attribute extraction unit obtains an attribute of the person extracted by the person extraction unit. A motion path creation unit creates a motion path of the person from positional information within the image of the person extracted by the person extraction unit. A measurement reference coordinate setting unit sets a measurement line (a first measurement line to a third measurement line) for the motion path corresponding to the person according to the attribute of the person extracted by the attribute extraction unit. A people number counting unit counts the number of people based on positional relation between the motion path of the person created by the motion path creation unit and the measurement line set within the image.

11 Claims, 10 Drawing Sheets

(51) Int. Cl.
 *G06T 7/00* (2006.01)
 *G06T 7/20* (2006.01)

(52) U.S. Cl.
 CPC ............ *G06T 7/20* (2013.01); *G06K 9/00771* (2013.01); *G06K 9/3241* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 2009/0115617 A1* | 5/2009 | Sano | G06F 17/30241 340/573.1 |
| 2009/0158309 A1* | 6/2009 | Moon | G06K 9/00778 725/12 |
| 2010/0027875 A1 | 2/2010 | Hampapur et al. | |
| 2011/0158482 A1* | 6/2011 | Johnson | G06K 9/00771 382/107 |
| 2011/0169917 A1* | 7/2011 | Stephen | G06T 7/2033 348/46 |

FOREIGN PATENT DOCUMENTS

| | | |
|---|---|---|
| JP | 09-093472 | 4/1997 |
| JP | 11-185008 | 7/1999 |
| JP | 2005-135339 | 5/2005 |
| JP | 2007-287094 | 11/2007 |
| JP | 2008-077430 | 4/2008 |

OTHER PUBLICATIONS

Beibei Zhan et al., "Crowd analysis: a survey", Machine Vision and Applications, Springer, Berlin, DE, vol. 19, No. 5-6, Apr. 10, 2008, pp. 345-357.

Vaquero et al., "Attribute-Based People Search in Surveillance Environments," Applications of Computer Vision (WACV), 2009 Workshop On, IEEE, Pisataway, NJ, USA, Dec. 7, 2009, pp. 1-8.

Extended European Search Report for EP application No. 12763977.1 having a mailing date of Jan. 15, 2015.

Chinese Official Action with English-language Translation for App. No. 201280016936.2, having a mailing date of Jun. 12, 2015.

Yu Qiu et al., "Pedestrian detection and counting in video surveillance", Oct. 15, 2010, *Microcomputer Information* (Measurement and Control Automation), vol. 26, No. 10-11, pp. 187-188.

* cited by examiner

| KIND OF ATTRIBUTE | | OPTIONS OF MEASUREMENT LINE |
|---|---|---|
| | | - FIRST MEASUREMENT LINE: LINE SET BY USER<br>- SECOND MEASUREMENT LINE: LINE FOR CHILDREN/ELDERLY PEOPLE (AUTOMATICALLY ADJUSTABLE)<br>- THIRD MEASUREMENT LINE: LINE FOR ADULT OF LOW DETECTION FREQUENCY (AUTOMATICALLY ADJUSTABLE) |
| AGE | ESTIMATE AGE AND GENDER BASED ON ANALYSIS OF PATTERN OF SHAPE OF PARTS OF FACE AND ANALYSIS OF LINES SUCH AS WINKLES AND SAG | CHANGE MEASUREMENT LINE FOR PERSON TO SECOND MEASUREMENT LINE WHEN PERSON IS DETERMINED AS CHILD OR ELDERLY PERSON |
| GENDER | | |
| SPEED | CALCULATE MOVING PIXELS PER UNIT TIME | DETERMINE PERSON AS CHILD OR ELDERLY PERSON WHEN MOVING AMOUNT (PIXELS) IS SMALL, AND CHANGE MEASUREMENT LINE FOR PERSON TO SECOND MEASUREMENT LINE |
| HEAD POSE | ESTIMATE HEAD POSE BASED ON ANALYSIS OF PATTERN OF SHAPE OF PARTS OF FACE | DETERMINE PERSON AS CHILD OR ELDERLY PERSON WHEN HEAD POSE (AVERAGE) WITHIN MOTION PATH OR HEAD POSE AT PREDETERMINED POSITION IS PREDETERMINED DEGREE OR MORE, AND CHANGE MEASUREMENT LINE TO SECOND MEASUREMENT LINE |
| DETECTION FREQUENCY OF PERSON | CALCULATE DETECTION NUMBER OF FACES PER SINGLE MOTION PATH | CHANGE MEASUREMENT LINE TO THIRD MEASUREMENT LINE WHEN DETECTION FREQUENCY IS SMALL<br><WHAT IS SMALL DETECTION FREQUENCY STATE?><br>- HIDE PERSON BY ANOTHER PERSON DUE TO CONGESTED STATE AT ENTRANCE<br>- DIFFICULT TO DETECT PERSON (APPEARANCE OF PERSON IS SIMILAR TO BACKGROUND, PERSON WEARS SUNGLASSES, etc.) |

NUMBER OF PERSONS MEASUREMENT DEVICE

TECHNICAL FIELD

The present invention relates to a people counting device which counts the number of people who have passed a measurement area set within an image of a shop or a facility.

BACKGROUND ART

Figure 9:
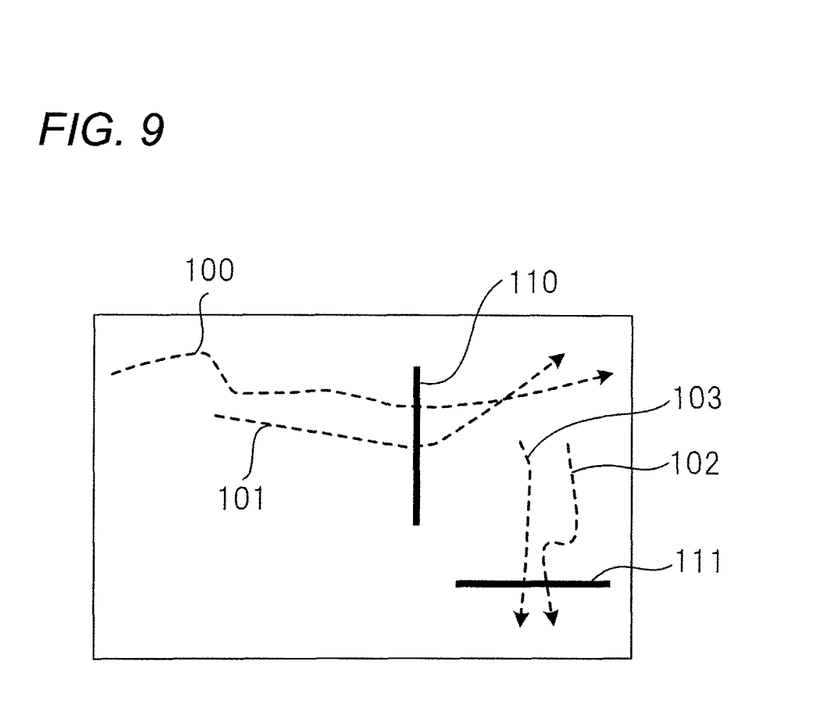
FIG. 9 is a diagram for explaining a method for counting the number of people in the related art.

As a technique similar to the people counting device, "Moving Body Detection System Using Image Sensor" disclosed in Patent Document 1 is known, for example. Patent Document 1 discloses a technique in which a motion path of a moving object is extracted from image data obtained at different time points, and the moving object is determined and counted as a person when the motion path passed through a virtual gate set on an observation image. FIG. 9 shows the technique. As shown in the drawing, when motion paths 100, 101 pass through a virtual gate 110, moving objects having moved on the motion paths 100. 101 are counted as passing people. Also, when motion paths 102, 103 pass through a virtual gate 111, moving objects having moved on the motion paths 102, 103 are counted as passing people.

RELATED ART DOCUMENTS

Patent Documents

Patent Document 1: JP-A-6-223157

SUMMARY OF THE INVENTION

Problem to be Solved by the Invention

Figure 10A:
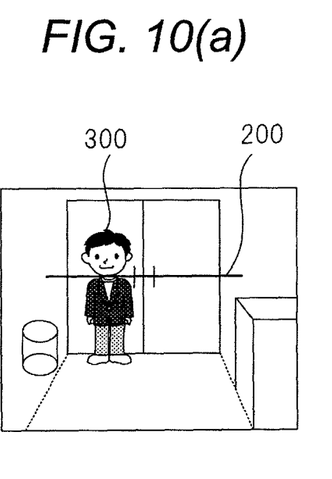
Figure 10B:
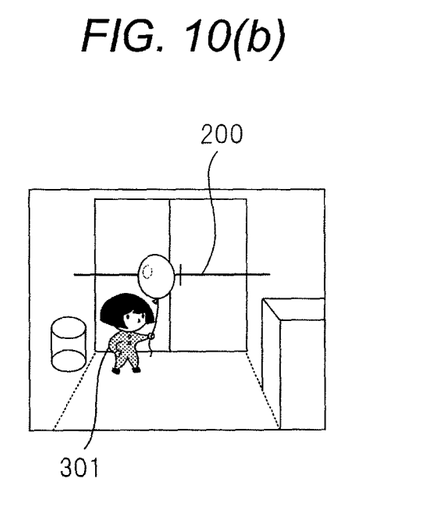

The related art technique is effective when a camera directed downward to pick up an image from a ceiling is used. However, when the number of people is counted under a normal setting condition of a camera (for example, set up at 2.6 m in height, and picking up images of an entrance and in the vicinity thereof), short-statured people such as children or elderly people are likely to fail to cross a measurement line. Thus, the number of people can not be counted accurately. When the measurement line is lowered, re-appearing people browsing in a shop may be counted again, for example. FIGS. 10(a) and 10(b) show such a case. When a measurement line 200 for an adult 300 of about 160 cm tall is set as shown in FIG. 10(a), a child 301 passes below the measurement line 200 as shown in FIG. 10(b). Thus, the child 301 can not be counted. Although the child 301 can be counted by lowering the measurement line 200, the same person may be counted again since an image of the person becomes small when the person moves away from the camera (not shown), whilst an image of the person becomes large when the person approaches the camera. In this manner, when the number of people is counted under the normal setting condition of a camera, the number of people may be counted with insufficient accuracy.

The present invention has been made in view of the above-described circumstances, and an object thereof is to provide a people counting device which can reliably count the number of people even for the short-statured people such as children or elderly people.

Means for Solving the Problem

A people counting device according to the present invention includes: an image input unit which inputs an image; a person extraction unit which extracts a person from the image input into the image input unit; a motion path creation unit which creates a motion path of the person from positional information in the image of the person extracted by the person extraction unit; a people number counting unit which counts a number of people based on a positional relation between the motion path of the person created by the motion path creation unit and a measurement reference coordinate set within the image; an attribute extraction unit which obtains an attribute of the person extracted by the person extraction unit; and a measurement reference coordinate setting unit which sets the measurement reference coordinate for the motion path corresponding to the person according to the attribute of the person extracted by the attribute extraction unit.

According to this configuration, since the measurement reference coordinate for the motion path corresponding to the person is set according to the attribute of the person, the number of people can reliably be counted even for the short-statured people such as children or elderly people.

In the above-described configuration, the attribute extraction unit extracts age as the attribute, and when the age is determined to be lower than a first predetermined age or higher than a second predetermined age, the measurement reference coordinate setting unit sets the measurement reference coordinate at a position in the image lower than that in a case except for the case in which the age is determined to be lower than the first predetermined age or higher than the second predetermined age.

According to this configuration, the number of people can reliably be counted even for the short-statured people such as children or elderly people.

In the above-described configuration, the attribute extraction unit extracts gender as the attribute, and when the gender is determined as female, the measurement reference coordinate setting unit sets the measurement reference coordinate at a position in the image lower than that in a case in which the gender is determined as male.

According to this configuration, the number of people can reliably be counted even when people are female.

In the above-described configuration, the attribute extraction unit extracts a moving speed as the attribute, and when the moving speed is determined to be lower than a predetermined speed, the measurement reference coordinate setting unit sets the measurement reference coordinate at a position in the image lower than that in a case except for the case in which the moving speed is determined to be lower than the predetermined speed.

According to this configuration, the number of people can reliably be counted even when the moving speeds of people are lower than the predetermined speed.

In the above-described configuration, the attribute extraction unit extracts a head pose as the attribute, and when the head pose is determined to be larger than a predetermined angle, the measurement reference coordinate setting unit sets the measurement reference coordinate at a position in the image lower than that in a case except for the case in which the head pose is determined to be larger than the predetermined angle.

According to this configuration, the number of people can reliably be counted even when the head pose is determined to be larger than the predetermined angle.

In the above-described configuration, when a detection frequency of the person is determined to be lower than a predetermined frequency, the measurement reference coordinate setting unit sets the measurement reference coordinate at a position in the image lower than that in a case except for the case in which the detection frequency of the person is determined to be lower than the predetermined frequency.

According to this configuration, the number of people can reliably be counted even when the detection frequency of the person is determined to be lower than the predetermined frequency.

In the above-described configuration, when a congestion degree is determined to be higher than a predetermined degree, the measurement reference coordinate setting unit sets the measurement reference coordinate at a position in the image lower than a case except for the case in which the congestion degree is determined to be higher than the predetermined degree.

According to this configuration, the number of people can reliably be counted even when the congestion degree is determined to be higher than the predetermined degree.

In the above-described configuration, a plurality of options are provided for the measurement reference coordinate set by the measurement reference coordinate setting unit.

According to this configuration, since the plurality of options are provided for the measurement reference coordinate, the measurement reference coordinate can be changed according to adult, children or elderly people. Thus, the number of people can reliably be counted.

In the above-described configuration, a not-applicable option is provided for the measurement reference coordinate set by the measurement reference coordinate setting unit.

According to this configuration, for example, the non-applicable setting is set when people are very crowded, the detection frequency is extremely small, or the moving speed is extremely high or low. Thus, since the erroneous counting can be prevented, the number of people can be counted accurately.

In the above-described configuration, the measurement reference coordinate is set to form a line, and the people number counting unit counts the motion path as a person when the motion path of the person crosses with the line.

According to this configuration, the number of people can reliably be counted.

In the above-described configuration, the measurement reference coordinate is set to form a rectangle, and the people number counting unit counts the motion path as a person when the motion path of the person crosses with the rectangle.

According to this configuration, the number of people can reliably be counted.

In the above-described configuration, the measurement reference coordinate is set to form a rectangle, and the people number counting unit counts when a start point of the motion path of the person locates within the measurement reference coordinate.

According to this configuration, the number of people can reliably be counted.

A people counting device according to the present invention includes: an image input unit which inputs an image; a person extraction unit which extracts a person from the image input into the image input unit; a motion path creation unit which creates a motion path of the person from positional information in the image of the person extracted by the person extraction unit; and a people number counting unit which counts a number of people based on a positional relation between the motion path of the person created by the motion path creation unit and a rectangle set within the image.

According to this configuration, the motion path of the person is created from the positional information in the image of the person extracted from the image, and the number of people is counted based on the positional relation between the created motion path of the person and the rectangle set in the image. Thus, the number of people can reliably be counted.

Advantages of the Invention

According to the present invention, since the measurement reference coordinate for the motion path corresponding to a person is set according to the attribute of the person, the number of people can reliably be counted even for short-statured people such as children or elderly people.

BRIEF DESCRIPTION OF THE DRAWINGS

FIGS. 10($a$) and 10($b$) are diagrams for explaining a problem of the method for counting the number of people in the related art.

MODE FOR CARRYING OUT THE INVENTION

Hereinafter, a preferred embodiment of this invention will be explained in detail with reference to drawings.

Figure 1:
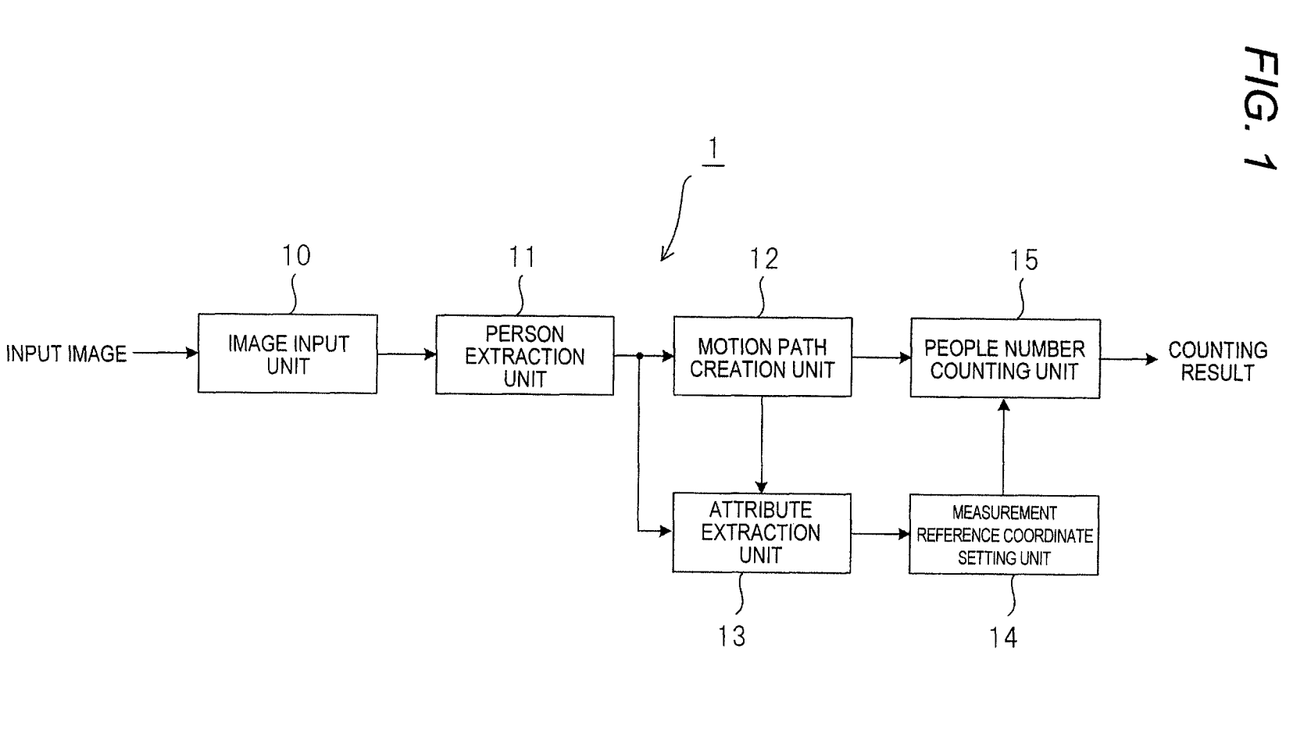
FIG. 1 is a block diagram showing a schematic configuration of a people counting device according to an embodiment of the invention.

FIG. 1 is a block diagram showing a schematic configuration of a people counting device according to the embodiment of this invention. In FIG. 1, the people counting device 1 according to this embodiment includes an image input unit 10, a person extraction unit 11, a motion path creation unit 12, an attribute extraction unit 13, a measurement reference coordinate setting unit 14 and a people number counting unit 15. The people counting device 1 sets a measurement reference coordinate for a motion path corresponding to a person according to an attribute of the person, and counts the number of people using the measurement reference coordinate.

The image input unit 10 inputs an image output from a camera (not shown). The person extraction unit 11 extracts a region of a person by using a pattern of shape of a face or the person or by using background difference information and/or inter-frame difference information based on the images input into the image input unit 10. The motion path creation unit 12 extracts a motion path of the person from a correlation (positions, image similarities) of regions of the person which are arranged in time sequence based on the regions of the person extracted by the person extraction unit 11. The attribute extraction unit 13 extracts attribute information such as age, gender, moving speed and a head pose (direction of a face) based on the regions of the person extracted by the person extraction unit 11. The attribute extraction unit 13 obtains the age, gender, etc., from the image input from the person extraction unit 11. Further, the attribute extraction unit 13 obtains the speed based on the motion path input from the motion path creation unit 12. The measurement reference coordinate setting unit 14 sets a measurement reference coordinate for each person in accordance with the attribute information obtained by the attribute extraction unit 13. The people number counting unit 15 counts a person in a case of passing through the measurement reference coordinate. The measurement reference coordinates form a measurement line. When the motion path of a person crosses with the measurement line, this motion path is counted as a person. According to the people counting device 1 of this embodiment, although a measurement area is set as a narrow line, the measurement area may be a wide rectangle. The wide-rectangular measurement area is explained at a last portion of this specification.

Figure 2:
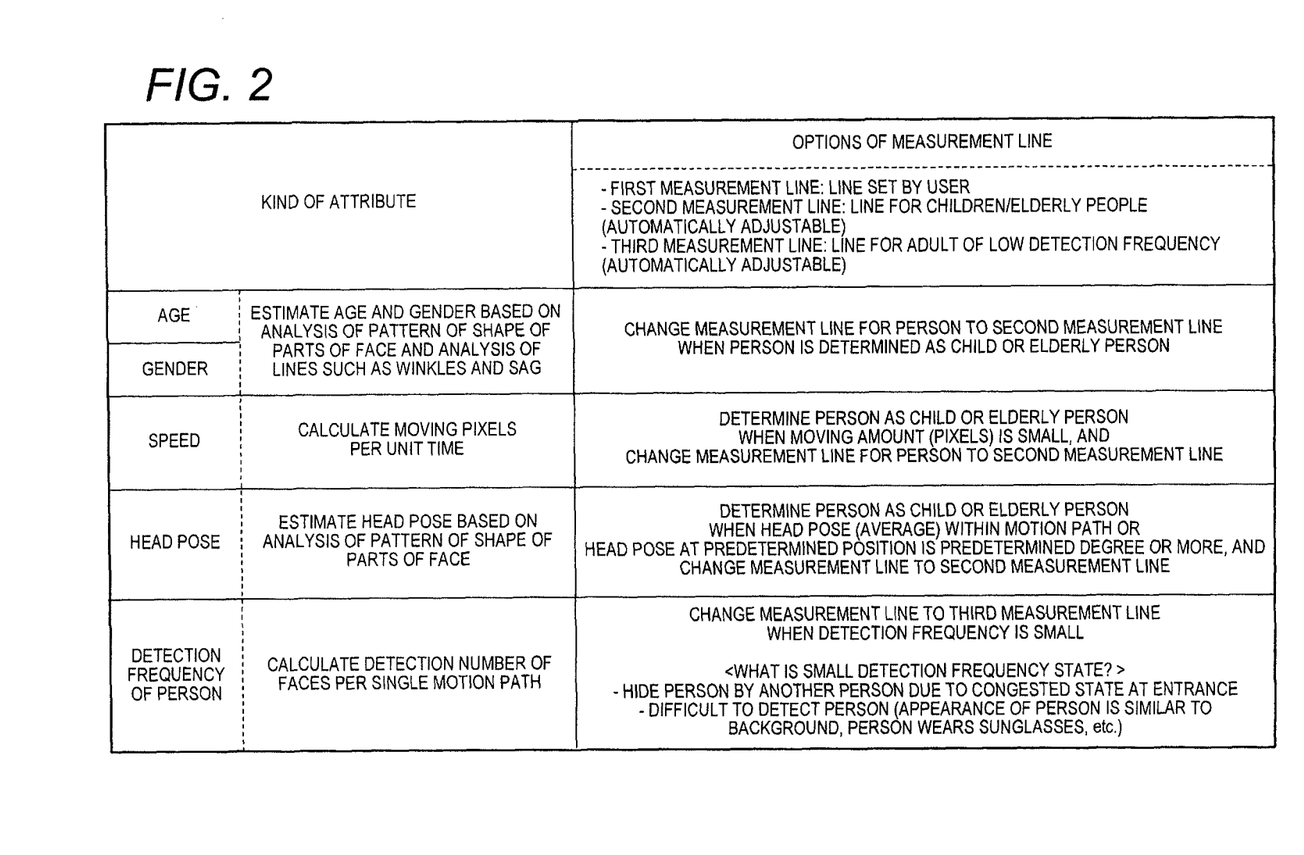
FIG. 2 is a diagram showing an example of method for dynamically changing a measurement line in the people counting device of FIG. 1.

FIG. 2 is a diagram showing an example of method for dynamically changing the measurement line. FIG. 2 shows "age", "gender", "speed", "head pose" and "detection frequency of person" as the kinds of attribute. The options for the measurement line includes a first measurement line to a third measurement line as follows:

the first measurement line which is a line set by a user;
the second measurement line which is a line for children/elderly people (automatically adjustable); and
third measurement line which is a line for adult of low detection frequency (automatically adjustable)

Figure 3:
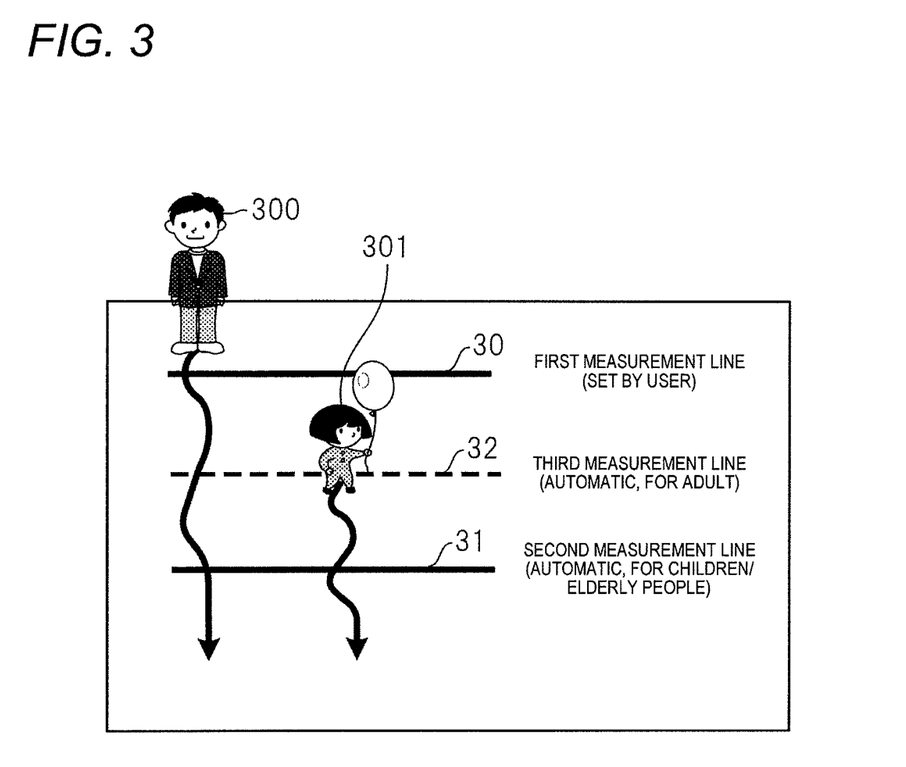
FIG. 3 is a diagram showing an example of a first measurement line which is set by a user, and a second and third measurement lines which are automatically adjustable, in the people counting device of FIG. 1.

FIG. 3 is a diagram showing an example of the first measurement line 30 which is set by a user, and the second measurement line 31 and the third measurement line 32 which are automatically adjustable.

Each of age and gender is estimated based on the analysis of pattern of shape of parts (eyes, nose, mouth) of face and the analysis of lines such as wrinkles and sag. As an option of the measurement line in the case of age and gender, the measurement line for the person is changed to the second measurement line 31 when the person is determined as an elderly person or a child.

Speed is obtained by detecting the moving pixels per unit time. As an option of the measurement line in the case of speed, a person is determined as a child or an elderly person when a moving amount (pixels) is small, and the measurement line for the person is changed to the second measurement line 31.

The head pose is estimated based on the analysis of pattern of shape of parts of face. As an option of the measurement line in the case of head pose, a person is determined as a child or an elderly person when the head pose (average) within the motion path or the head pose at a predetermined position is a predetermined degree or more, the measurement line for the person is changed to the second measurement line 31. Since children are low in their heights, their head poses are directed downward when seen from the camera (not shown). Since elderly people are bent over, their head poses are directed downward when seen from the camera. In this manner, children and elderly person can be identified since their head poses are directed downward.

The detection frequency of person is obtained by calculating the detection number of faces per single motion path. As an option of the measurement line in the case of detection frequency of person, when the detection frequency is small, the measurement line for the person is changed to the third measurement line 32.

The small detection frequency state is defined under the situation as follows:

the person is hidden by other persons due to congested state at an entrance and in the vicinity thereof; and/or
it is difficult to detect the person (an appearance of the person is similar background, the person wears sunglasses, etc.).

Next, operation of the people counting device 1 according to this embodiment will be explained.

Figure 4:
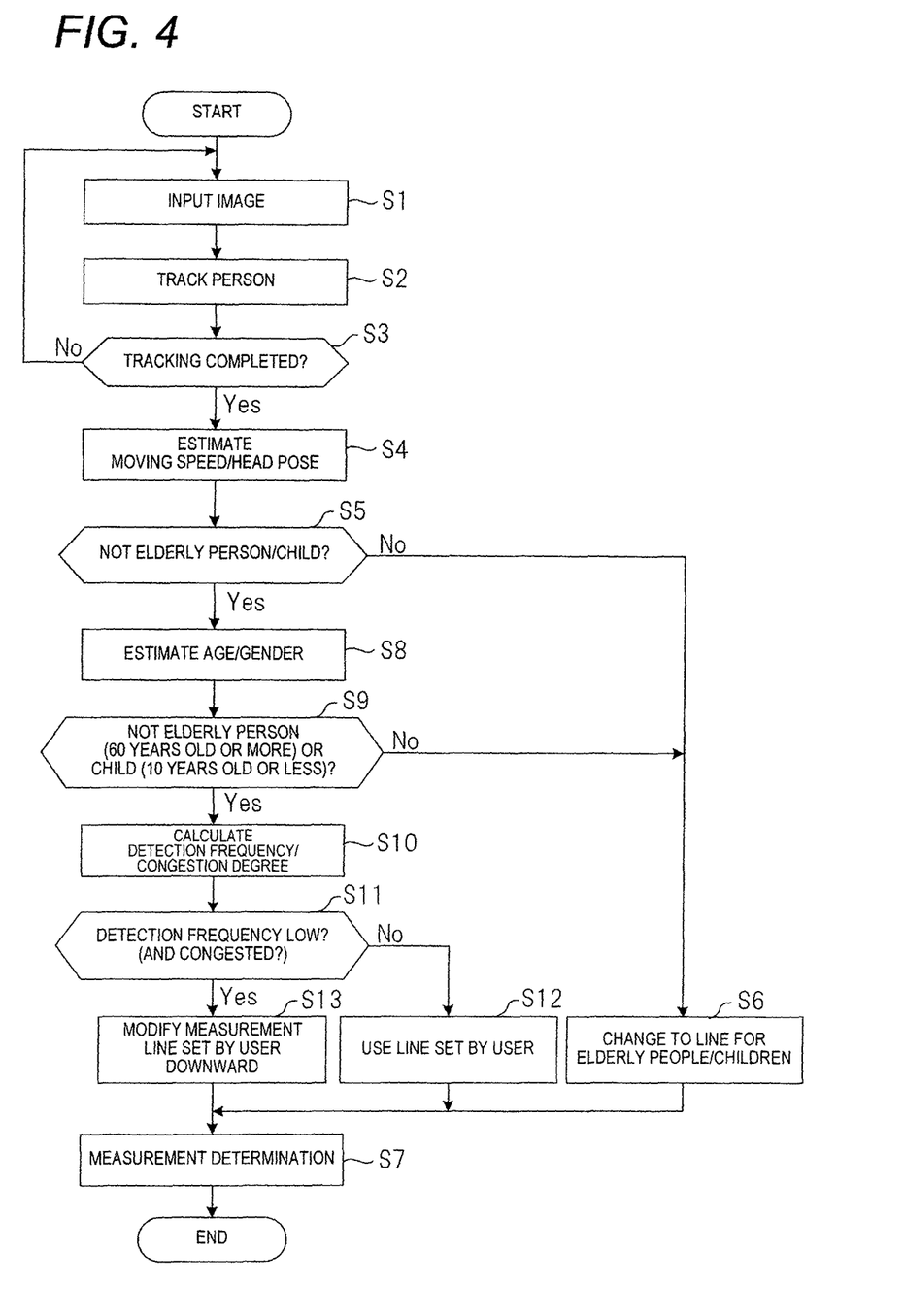
FIG. 4 is a flowchart for explaining the operation of the people counting device in FIG. 1.
Figure 5:
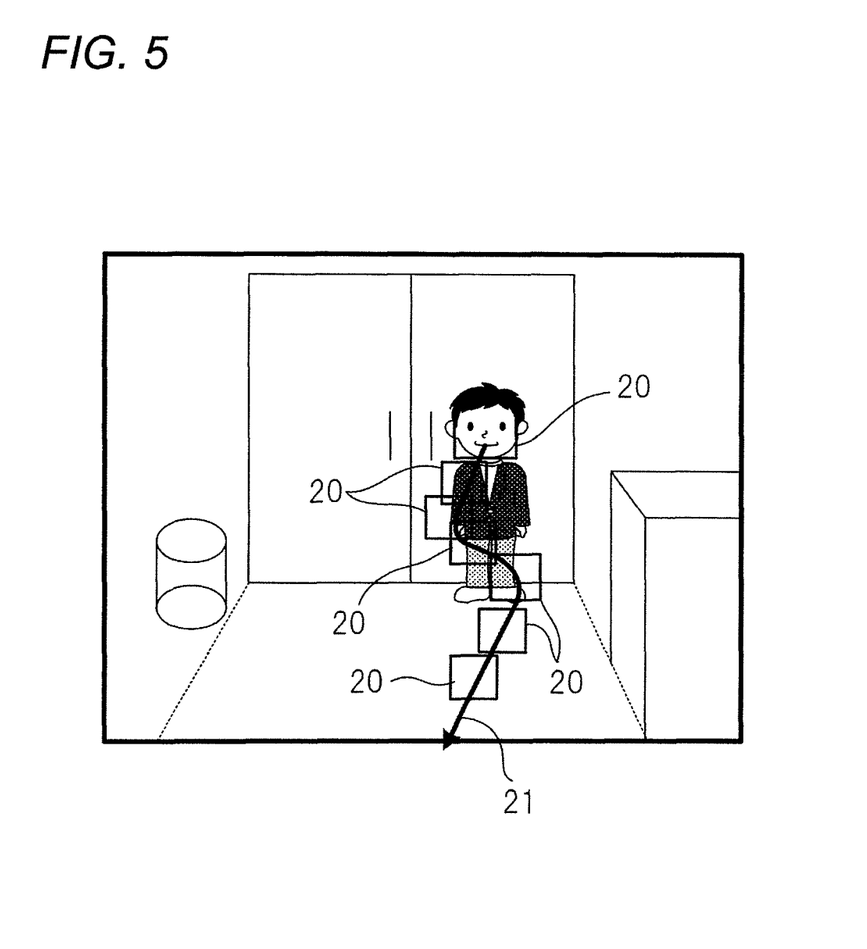
FIG. 5 is a diagram for explaining the tracking method of the people counting device in FIG. 1.

FIG. 4 is a flowchart for explaining the operation of the people counting device 1 according to this embodiment. In FIG. 4, firstly, the image input unit 10 inputs an image (step S1), and the person extraction unit 11 extracts a region of a person from the image input into the image input unit 10. Then, the motion path creation unit 12 extracts a motion path of the person extracted by the person extraction unit 11 and starts to track the person (step S2). As a method for tracking a person, there is a tracking method using a frame of face, for example. FIG. 5 is a diagram for explaining the tracking method using the face frame. As shown in FIG. 5, face frames 20 are connected in chronological order based on the moving amount and the moving direction per unit time of each of the face frames 20 which has been detected. A motion path 21 is obtained by connecting the face frames 20 in chronological order.

Returning to FIG. 4, after starting to track the person, the process of steps S1 to S3 are performed until the completion of the tracking. When it is determined that the tracking is not completed yet in step S3 (in a case of "No" in step S3), the processing returns to step S1. When it is determined that the tracking is completed (in a case of "Yes" in step S3), the moving speed and the head pose is estimated (step S4). After estimating the moving speed and the head pose, it is determined whether the tracked person is not an elderly person or a child based on the estimation result (step S5). In this confirmation, when the tracked person is determined as an elderly person or a child ("No" in step S5), the measurement line is changed to the second measurement line 31 for elderly people/children (step S6). Then, measurement determination for counting the number of people using the second measurement line 31 is performed (step S7).

Figure 6:
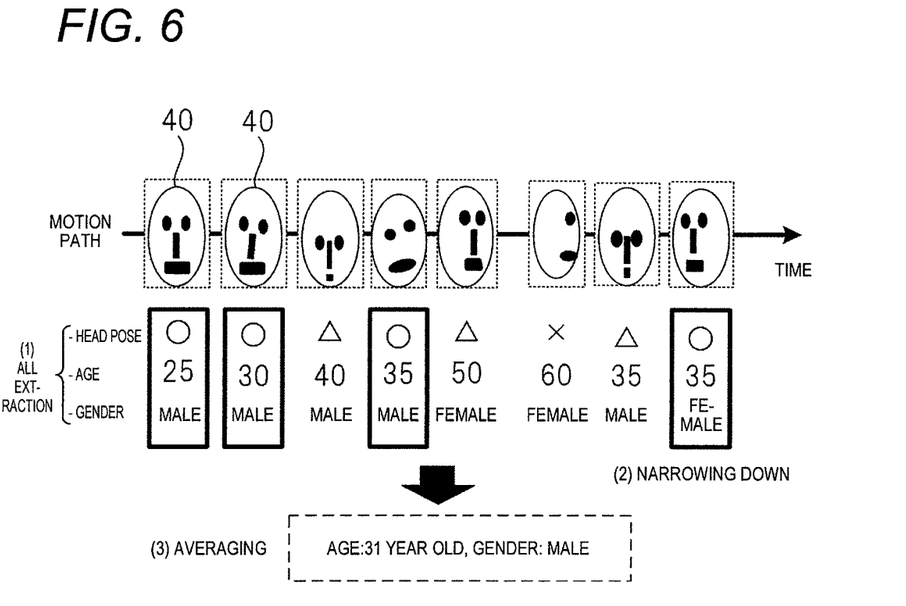
FIG. 6 is a diagram for explaining a method for estimating age/gender in the people counting device of FIG. 1.

In contrast, in the determination of step S5, when the tracked person is determined as a person except for an elderly person or a child ("Yes" in step S5), the age/gender is estimated (step S8). The age/gender is estimated in a manner as shown in FIG. 6. FIG. 6 is a diagram for explaining a method for estimating the age/gender. As shown in FIG. 6, at first, (1) the estimation process is executed for all faces 40 in the extracted motion path. Then, (2) the faces usable for estimating the age/gender are narrowed down based on the head pose. After narrowing down the faces usable for estimating the age/gender, (3) values of the age/gender of the narrowed down (plural) faces 40 are averaged. The head pose shown by "○" is directed to almost front, and the head pose shown by "×" is directed to almost side. In the example of FIG. 6, the age is 31 years old and the gender is male. That is, (25+30+35+35)/4≈31 years old. Since the number of male is "3" and the number of female is "1", the gender is determined as the male.

Returning to FIG. 4, then, according to the estimation result of the age/gender, it is also determined whether the person is an elderly person (60 years old or more) or a child (10 years old or less) (step S9). In this determination, when the person is determined as an elderly person (60 years old or more) or a child (10 years old or less) ("No" in step S9), the measurement line is changed to the second measurement line 31 for elderly people/children (step S6). Then, the measurement determination for counting the number of people is performed by using the second measurement line 31 (step S7).

In contrast, in the determination of step S9, when the person is determined as a person except for an elderly person (60 years old or more) or a child (10 years old or less) ("Yes" in step S9), the detection frequency/congestion degree is calculated (step S10). Next, according to the estimation result of the detection frequency/congestion degree, it is determined whether the detection frequency is low (and congested) (step S11). In this determination, when the detection frequency is determined not to be low (and not congested) ("No" in step S11), the first measurement line set by the user (measurement line determined at first) 30 is set (step S12), and the measurement determination for counting the number of people is performed by using the first measurement line 30 (step S7).

In the determination of step S11, when the detection frequency is determined to be low (and congested) ("Yes" in step S11), the first measurement line 30 set by the user is modified downward (step S13), and the measurement determination for counting the number of people is performed by using the modified third measurement line 32 (step S7). Although the detection frequency/congestion degree is not an attribute, it is used as a determination element for adjusting the measurement line. After completing the processing of step S7, the processes of this embodiment is terminated.

The people counting device 1 of this embodiment includes: the image input unit 10 which inputs an image; the person extraction unit 11 which extracts a person from the image input into the image input unit 10; the motion path creation unit 12 which creates a motion path of the person from the positional information within the image of the person extracted by the person extraction unit 11; the attribute extraction unit 13 which obtains the attribute, that is, moving speed, head pose, age, gender, detection frequency, and congestion degree, of the person extracted by the person extraction unit 11; the measurement reference coordinate setting unit 14 which sets the measurement line (first measurement line 30 to third measurement line 32) for the motion path corresponding to the person according to the attribute of the person extracted by the attribute extraction unit 13; and the people number counting unit 15 which counts the number of people based on a positional relation between the motion path of the person created by the motion path creation unit 12 and the measurement line set within the image, thereby setting the measurement line for the motion path corresponding to the person according to the moving speed, head pose, age, gender, detection frequency, and congestion degree of the person. Thus, the number of people can reliably be counted even for the short-statured people such as children or elderly people.

Although the three measurement lines (first measurement line 30 to third measurement line 32) are set in the people counting device 1 according to this embodiment, the number of lines may be increased. In this case, the number of people can be counted more accurately. For example, when the person is determined as female, a measurement line slightly lower than the first measurement line 30 may be set, whereby the female can reliably be counted.

In the people counting device 1 according to this embodiment, when the determination using the first measurement line 30 to the third measurement line 32 is impossible, an option representing "not applicable" may be output. For example, the "not applicable" option is output for the case in which (1) people are so crowded, (2) the detection frequency is extremely small, (3) the moving speed is extremely high, or (4) the moving speed is extremely low. In this case, the erroneous counting of the number of people can be prevented, whereby the number of people can be counted accurately.

Figure 7:
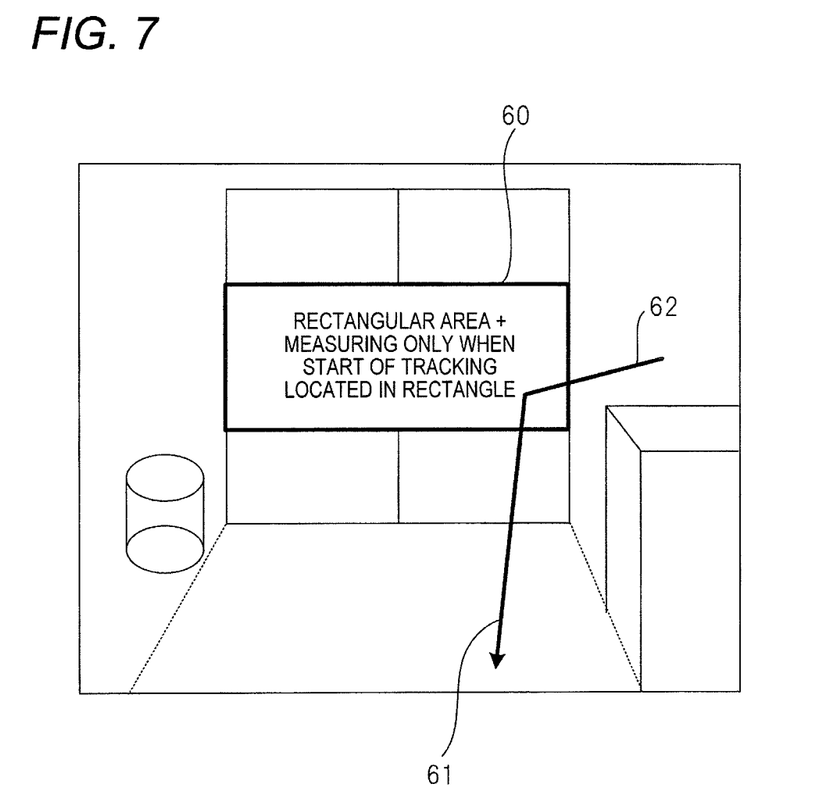
FIG. 7 is a diagram showing an example where a measurement area is set as a rectangle in the people counting device of FIG. 1.

Although the measurement area is set as the narrow line in the people counting device 1 according to this embodiment, a wide rectangular area may be used. FIG. 7 is a diagram showing an example where the measurement area is set as a rectangle. When the measurement area is set as the narrow line, people largely different in heights may not be covered. However, when the wide rectangular area is used, the improvement of accuracy when changed to the second or third measurement line can be expected. Further, if the number of person is counted only when the tracking within a rectangular measurement area 60 is started (for example, when a motion path shown by an arrow 61 is detected), it is possible to prevent re-counting of a person having entered into a shop (in a case of a shop) and browsing within the shop (for example, a motion path as shown by an arrow 62). In this case, the condition for counting a person may be set such that the start point of the motion path locates within the rectangle and the motion path crosses with the outer periphery of the rectangle once or more times. Alternatively, as the condition for counting the person, a motion path may not cross with the outer periphery of the rectangle, and the start point of the motion path merely locates within the rectangle. In this condition, the number of people can be counted even in a state that the person is hidden by another person due to congested state at an entrance and the small detection frequency.

The process of the people counting device 1 according to this embodiment shown in FIG. 4 may be described as programs, and the programs may be stored in a recording medium such as a magnetic disk, an optical disc, a magneto optical disc or a semiconductor memory, and then distributed.

Figure 8:
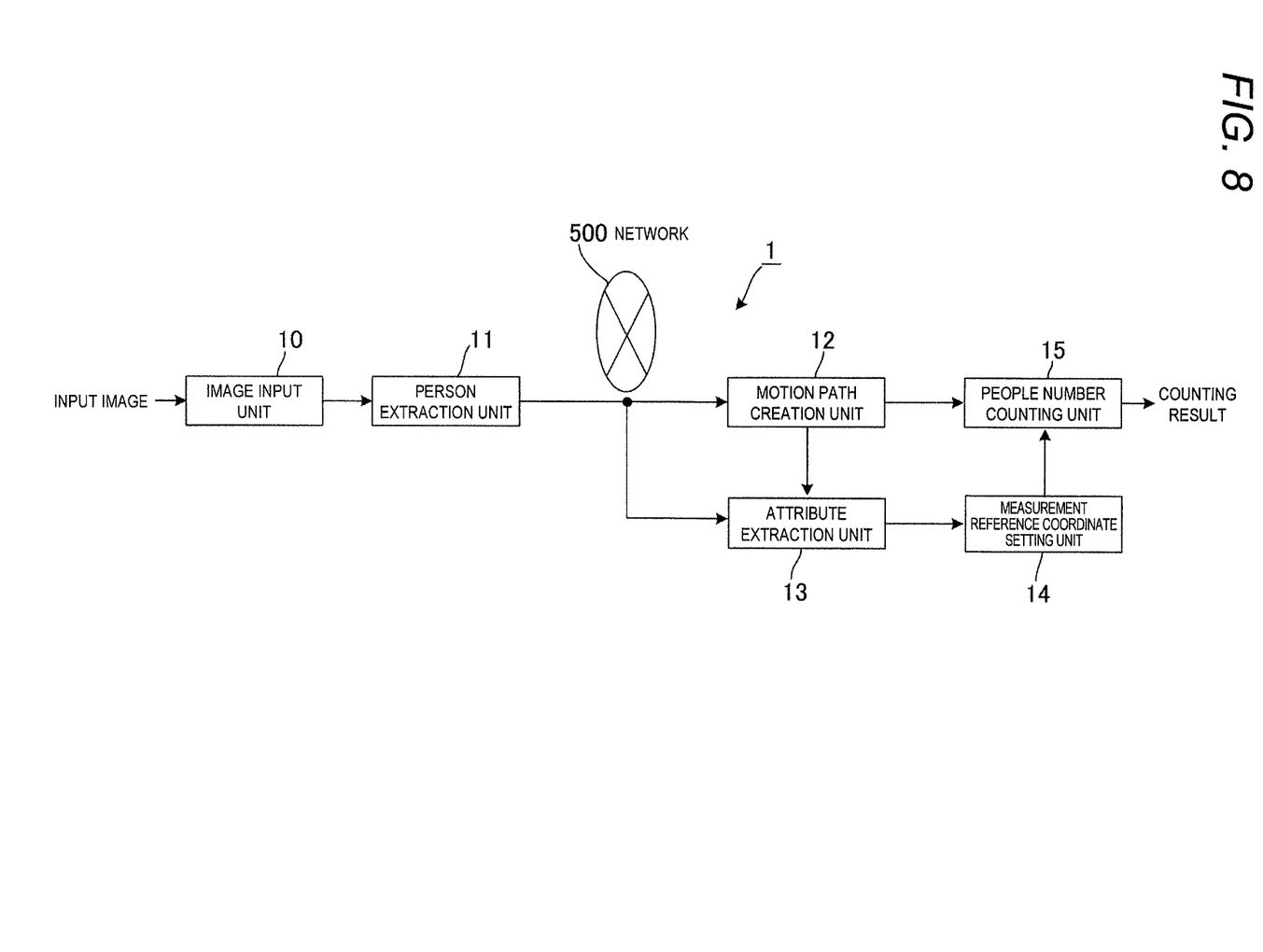
FIG. 8 is a block diagram showing the schematic configuration of an application example of the people counting device in FIG. 1.

The people counting device 1 according to this embodiment may be configured using a network 500 as shown in FIG. 8. For example, the positional information of the person extracted by the person extraction unit 11 within a viewing angle and an entire body image (or a face image) of the person may be sent to the network 500, and the motion path creation unit 12 and the attribute extraction unit 13 may perform the respective processes based on the positional information within the viewing angle and the entire body image sent from the network 500.

Since a load of the network 500 becomes large if the entire body image of the person is transmitted at every frame, the entire body image may be transmitted only when the size of face has a predetermined value or more.

Further, the attribute extraction unit 13 may also be provided on the transmission side to the network, and only text information, such as the positional information within the viewing angle and the person attribute information (direction, age, gender, etc.), is transmitted to the network 500, whereby the load of the network 500 can be reduced.

Although the present invention is explained in detail with reference to the specific embodiment, it is apparent for those skilled in the art that various changes and modifications may be made without departing from the spirit and scope of this invention.

The present invention is based on Japanese Patent Application (Application No. 2011-080294) filed on Mar. 31, 2011, the contents of which are incorporated herein by reference.

INDUSTRIAL APPLICABILITY

The present invention has an advantage that the number of people can reliably be counted even for the short-statured people such as children or elderly people, and is applicable to a device or system for counting the number of people entering into a shop or a facility.

DESCRIPTION OF REFERENCE SKINS

1: People Counting Device
10: Image Input Unit
11: Person Extraction Unit
12: Movement Path Creation Unit
13: Attribute Extraction Unit
14: Measurement Reference Coordinate Setting Unit
15: People Number Counting Unit
20: Face Frame
21: Motion Path
30: First Measurement Line
31: Second Measurement Line
32: Third Measurement Line
40: Face
60: Measurement Area
300: Adult
301: Child
500: Network

What is claimed is:

1. A people counting device comprising:
a processor; and
a memory storing instructions that, when executed by the processor, cause the processor to perform operations including:
inputting an image;
extracting a person from the image;
creating a motion path of the person from positional information in the image of the person extracted;
counting a number of people based on a positional relation between the motion path of the person and a measurement reference coordinate set within the image;
obtaining at least one attribute of the person; and
setting the measurement reference coordinate for the motion path corresponding to the person according to the at least one attribute of the person, wherein
the at least one attribute extracted is an age of the person,
when the age is determined to be one of lower than a first predetermined age and higher than a second predetermined age, the processor sets the measurement reference coordinate at a lower position in the image, with respect to a standing state of the person in the image, than a position set when the age is determined to be one of the first predetermined age, the second predetermined age, and an age between the first predetermined age and the second predetermined age, and
the second predetermined age is greater than the first predetermined age.

2. The people counting device according to claim 1, wherein the at least one attribute extracted further includes a gender of the person, and
when the gender is determined as female, the processor sets the measurement reference coordinate at a position in the image lower, with respect to the standing state of the person in the image, than a position set when the gender is determined as male.

3. The people counting device according to claim 1, wherein
the at least one attribute extracted further includes a moving speed of the person, and
when the moving speed is determined to be lower than a predetermined speed, the processor sets the measurement reference coordinate at a position in the image lower, with respect to the standing state of the person in the image, than a position set when the moving speed is determined to be one of greater than and equal to the predetermined speed.

4. The people counting device according to claim 1, wherein
the at least one attribute extracted further includes a head pose of the person, and
when the head pose is determined to be larger than a predetermined angle, the processor sets the measurement reference coordinate at a position in the image lower, with respect to the standing state of the person in the image, than a position set when the head pose is determined to be one of less than and equal to the predetermined angle.

5. The people counting device according to claim 1, the memory storing instructions that, when executed by the processor, cause the processor to perform operations further including:
determining a detection frequency of the person, wherein
when the detection frequency of the person is determined to be lower than a predetermined frequency, the processor sets the measurement reference coordinate at a position in the image lower, with respect to the standing state of the person in the image, than a position set when the detection frequency of the person is determined to be one of greater than and equal to the predetermined frequency.

6. The people counting device according to claim 1, the memory storing instructions that, when executed by the processor, cause the processor to perform operations further including:
determining a congestion degree of the person, wherein
when the congestion degree is determined to be higher than a predetermined degree, the processor sets the measurement reference coordinate at a position in the image lower, with respect to the standing state of the person in the image, than a position set when the congestion degree is determined to be one of lower than and equal to the predetermined degree.

7. The people counting device according to claim 1, the memory storing instructions that, when executed by the processor, cause the processor to perform operations further including:
providing a plurality of options for the measurement reference coordinate set by the processor.

8. The people counting device according to claim 1, the memory storing instructions that, when executed by the processor, cause the processor to perform operations further including:
providing a not-applicable option for the measurement reference coordinate set by the processor.

9. The people counting device according to claim 1, the memory storing instructions that, when executed by the processor, cause the processor to perform operations further including:
setting the measurement reference coordinate to form a line, wherein
when the motion path of the person crosses with the line, the processor counts the person in the counting of the number of people.

10. The people counting device according to claim 1, the memory storing instructions that, when executed by the processor, cause the processor to perform operations further including:

setting the measurement reference coordinate to form a rectangle, wherein when the motion path of the person crosses with the rectangle, the processor counts the person in the counting of the number of people.

11. The people counting device according to claim 1, the memory storing instructions that, when executed by the processor, cause the processor to perform operations further including:

setting the measurement reference coordinate to form a rectangle, wherein when a start point of the motion path of the person is located within the measurement reference coordinate, the processor counts the person in the counting of the number of people.

* * * * *